US008392163B2

(12) United States Patent
Liu (10) Patent No.: US 8,392,163 B2
(45) Date of Patent: Mar. 5, 2013

(54) VIRTUAL PETROLEUM SYSTEM WITH SALT RESTORATION FUNCTIONALITY

(75) Inventor: Jianchang Liu, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 310 days.

(21) Appl. No.: 12/132,525

(22) Filed: Jun. 3, 2008

(65) Prior Publication Data

US 2009/0299710 A1    Dec. 3, 2009

(51) Int. Cl.
*G06G 7/48* (2006.01)
(52) U.S. Cl. .................................................. 703/10
(58) Field of Classification Search .............. 703/6, 9, 703/10; 702/5, 11–14, 16
See application file for complete search history.

(56) References Cited

U.S. PATENT DOCUMENTS

| 6,662,146 | B1 | 12/2003 | Watts |
| 6,690,820 | B2 | 2/2004 | Lees |
| 6,765,570 | B1 | 7/2004 | Cheung |
| 6,792,354 | B1 | 9/2004 | O'Meara, Jr. |
| 6,825,838 | B2 | 11/2004 | Smith |
| 6,829,570 | B1 | 12/2004 | Thambynayagam |
| 6,987,878 | B2 | 1/2006 | Lees |
| 7,006,085 | B1 | 2/2006 | Acosta |
| 7,054,749 | B1 | 5/2006 | O'Meara, Jr. |
| 7,098,908 | B2 | 8/2006 | Acosta |
| 7,239,311 | B2 | 7/2007 | Dunn |
| 7,248,258 | B2 | 7/2007 | Acosta |
| 7,302,373 | B2 | 11/2007 | Fleury |
| 2002/0120429 | A1 | 8/2002 | Ortoleva |

FOREIGN PATENT DOCUMENTS

WO    WO 03/100463 A1    12/2003
WO    WO 2009/148681 A3   12/2009

OTHER PUBLICATIONS

F. Schneider, et al., "A 3D Basin Model for Hydrocarbon Potential Evaluation: Application to Congo Offshore", 2000, Oil & Gas Science and Technology, vol. 55 No. 1, pp. 3-13.*
James C. Howard, "Computer Simulation Models of Salt Domes", 1971, The American Association of Petroleum Geologists Bulletin, vol. 5 No. 3, pp. 495-513.*
Tuncay K et al: "Salt tectonics as a self-organizing process: A reaction, transport, and mechanics model" Journal of Geophysical Research, American Geophysical Union, US LNKDDOI: 10.1029/2000JB900107, vol. 106, No. B1, Jan. 10, 2001, pp. 803-817.

(Continued)

*Primary Examiner* — Mary C Jacob
*Assistant Examiner* — Aniss Chad
(74) *Attorney, Agent, or Firm* — Chevron U.S.A. Inc.

(57) ABSTRACT

A method of modeling a salt history for a geologic region containing a salt formation includes defining initial geometry of salt volume and sediment volume in three dimensions, changing geometry of the salt top and maintain the geometries of a top of the sediment and a base of the salt formation for a plurality of time steps, and for each change of geometry, conserving a volume of salt and a volume of sediment. The method includes initially constraining a geometry of the base of the salt during the changing geometry of the salt and sediment volumes, modeling geological activity in the geologic region and modifying the base of the salt formation during a time of the time steps, and modifying the volumes in accordance with the modeled geological activity.

14 Claims, 11 Drawing Sheets

OTHER PUBLICATIONS

Tuncay K et al: "3D fracture network dynamics in reservoirs, faults and salt tectonic systems" Special Publication, Geological Society (London), UK LNKDDOI: I0.1144/GSL.SP.2003.209.01.14, vol. 209, Jan. 1, 2003, pp. 155-175.

Weijermars, R., Jackson, M.P.A., Vendeville, B.: "Rheological and tectonic modeling of salt provinces" Tectonophysics, vol. 217, No. 1-2, Jan. 15, 1993, pp. 143-174.

Arikawa et al., Personal Dynamic Maps Based on Distributed Geographic Information Servers, *Vehicle Navigation and Information System Conference.* Aug. 31-Sep. 2, 1994, New York, IEEE, Aug. 31, 1994, pp. 591-596.

Arnold et al., Analysing Product-Specific Behaviour to Support Process dependent Updates in Dynamic Spatial Updating Model, *Transactions in GIS*, May 17, 2005, vol. 9(3), pp. 397-419.

Bode et al., First Experiences with GEOSTORE, an Information System for Geologically defined Geometries, *Lecture Notes in Computer Science*, Feb. 1, 1994, pp. 35-44.

Falivene et al., Statistical grid-based facies reconstruction and modeling for sedimentary bodies. Alluvial-palustrine and turbiditic examples, *Geologica Acta*, 2007, vol. 5, No. 3, pp. 199-230.

Falivene, et al., Optimum and robust 3D facies interpolation strategies in a heterogeneous coal zone (Tertiary As Pontes basin, NW Spain), *International Journal of Coal Geology*, Elsevier, vol. 71, No. 2-3, May 5, 2007, pp. 185-208.

Goleby et al., An integrated multi-scale 3D seismic model of the Archaean Yilgarn Craton, Australia, *Tectonophysics*, Elsevier, Amsterdam, NL, vol. 420, No. 1-2, Jun. 26, 2006, pp. 75-90.

Kaufmann et al., 3D geological modeling from boreholes, cross-sections and geological maps, application over former natural gas storages in coal mines, *Computers and Geosciences*, Elsevier, Pergamon Press, Oxford, GB, vol. 34, Dec. 12, 2007, pp. 278-290.

Li et al., Three Dimension Construction and Magnetic Fabric Analysis of the Yanjinggou Fault-propagation Fold in Western Sichuan, China, *Earth Science Frontiers*, vol. 14, No. 4, Jul. 2007, pp. 74-84.

Malehmir et al., Regional structural profiles in the western part of the Palaeoproterozoic Skellefte Ore District, northern Sweden, *Precambrian Research*, Elsevier, vol. 159, No. 1-2, Oct. 1, 2007, pp. 1-18.

Malolepszy, Z., Three-Dimensional Geological Maps, *Springer*, 2005, pp. 215-224.

Masumoto et al., Construction and Visualization of Three dimensional Geologic Model Using GRASSS GIS, Proceedings of the Open source GIS—GRASS users conference, 2002, pp. 1-8.

PCT International Search Report, PCT/US2009/040535, Nov. 17, 2009, 6 pages.

PCT International Search Report, PCT/US2009/040537, Aug. 6, 2009, 3 pages.

PCT International Search Report, PCT/US2009/040542, Aug. 11, 2009, 3 pages.

Qi et al., Neural Network Prediction of carbonate lithofacies from well logs, Big Bow and Sand Arroyo Creek fields, Southwest Kansas, *Computers and Geosciences*, Pergamon Press, Oxford, GB, vol. 32, No. 7, Aug. 2006, pp. 947-964.

Sester et al., New Methods for semantic and geometric integration of geoscientific data sets with ATKIS—applied to geo-objects from geology and soil science, *Geotechnologien*, 2003, 12 pages.

Winkler et al., Design and Implementation of an Immersive Geosciences Tool Kit, Proceedings Visualization 99, San Francisco, CA, Oct. 24-29, 1999, Piscataway, NJ USA, IEEE, US, Jan. 1, 1999, pp. 429-556, XP031172638, p. 429, left-hand column, paragraphs 3-7, p. 429, right hand column, paragraphs 4-6, p. 430, left hand column, paragraph 1-7.

* cited by examiner

VIRTUAL PETROLEUM SYSTEM WITH SALT RESTORATION FUNCTIONALITY

BACKGROUND

1. Field of the Invention

The present invention relates generally to processing of geological data and more particularly to a system for three-dimensional analysis and visualization.

2. Description of the Related Art

Analysis and visualization of data relating to oil and gas exploration generally involve custom software tools that have specific, narrow functionality. Much of the analysis of data still requires human interpretation of ambiguous information. When the operator makes a decision on the proper interpretation of image data, that information is generally restricted to the particular interpretive tool on which the operator is currently working and does hot propagate to other software tools. Likewise, sharing between physical locations may be difficult, which can raise issues where experts from various disciplines are not co-located, but have a need for cooperation.

SUMMARY

Aspects of embodiments of the present invention provide a method of modeling a salt history for a geologic region containing a salt formation including defining initial geometry of salt volume and sediment volume in three dimensions, changing geometry of the salt top and maintain the geometries of a top of the sediment and a base of the salt formation for a plurality of time steps, and for each change of geometry, conserving a volume of salt and a volume of sediment. The method may include initially constraining a geometry of the base of the salt during the changing geometry of the salt and sediment volumes, modeling geological activity in the geologic region and modifying the base of the salt formation during a time of the time steps, modifying the volumes in accordance with the modeled geological activity, initially constraining a geometry of the base of the salt during the changing geometry of the salt and sediment volumes, modeling geological activity in the geologic region and modifying the base of the salt formation during a time of the time steps, and modifying the volumes in accordance with the modeled geological activity.

Aspects of embodiments of the present invention provide a system for modeling a salt history for a geologic region containing a salt formation including a data storage system; configured and arranged to store data representing initial geometry of salt volume and sediment volume in three dimensions, a modeling module, configured and arranged to model changing geometry of the salt top while maintaining the geometries of a top of the sediment and a base of the salt formation for a plurality of time steps, to conserve a volume of salt and a volume of sediment for each change of geometry, to initially constrain a geometry of the base of the salt during the changing geometry of the salt and sediment volumes, to model geological activity in the geologic region arid modifying the base of the salt formation during a time of the time steps, and to modify the volumes in accordance with the modeled geological activity.

Aspects of embodiments of the invention may include a computer-readable medium encoded with computer-executable instructions for performing the foregoing method or for controlling the foregoing system.

Aspects of embodiments of the invention may include a system incorporating the foregoing system and configured and arranged to provide control of the system in accordance with the foregoing method. Such a system may incorporate, for example, a computer programmed to allow a user to control the device in accordance with the method, or other methods.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

A virtual petroleum system in accordance with an embodiment of the present invention includes a number of software modules that are interconnected for efficient sharing and processing of data. As illustrated schematically in FIG. 1, the system 100 includes an input module 102, that is configured to accept relevant data, which may include multiple types of data (e.g., seismic data, well logs, and the like). The data is indicative of one or more characteristics of a geological region under investigation.

Figure 1:
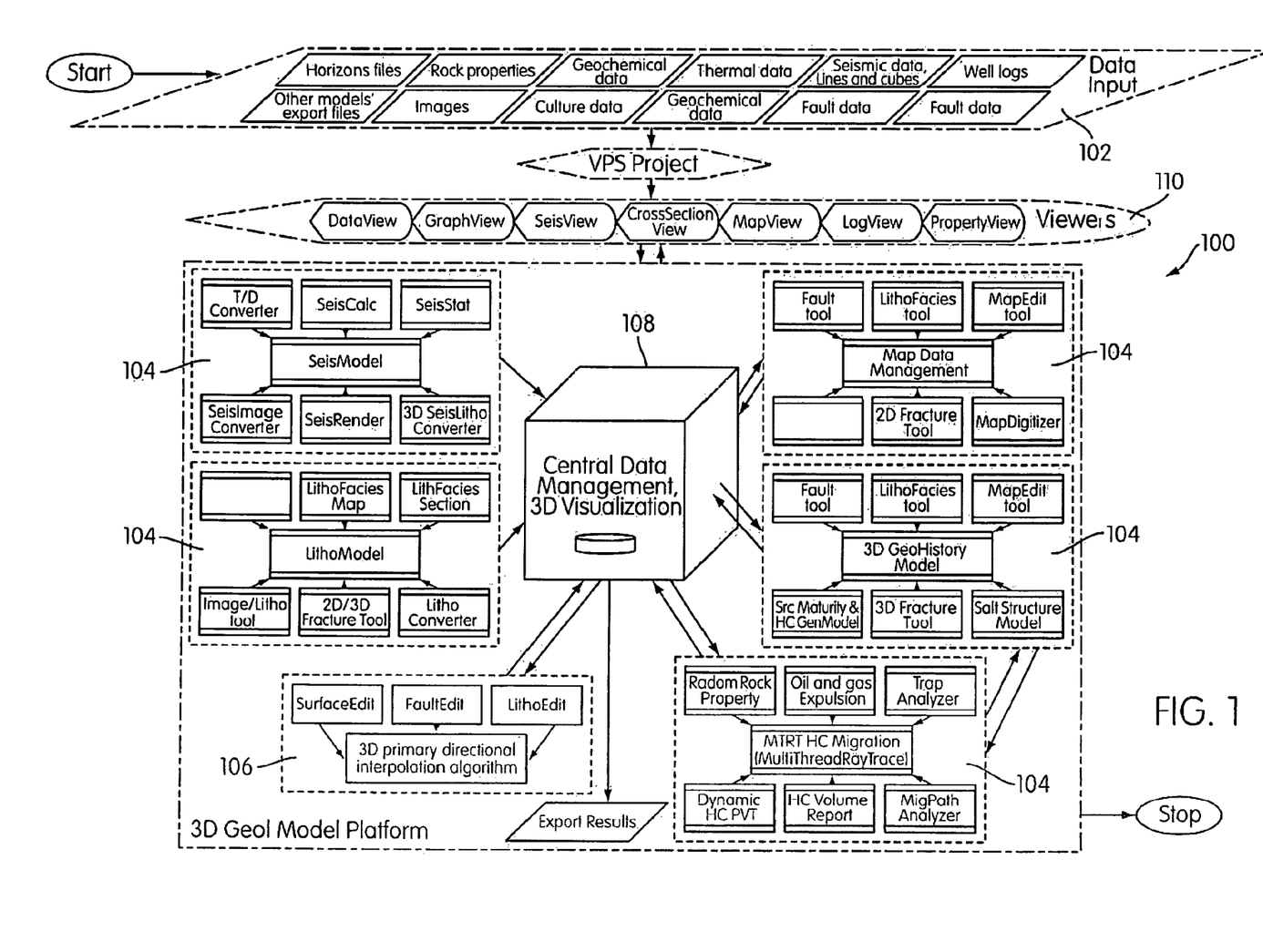
FIG. 1 is a schematic diagram of an architecture of a system in accordance with an embodiment of the present invention.

In an example, the input module 102 may be Configured to accept data including horizons files, rock properties, geochemical data, thermal data, seismic data (which may be, for example, raw seismic data, 2-d lines, and/or 3-d cubes), well logs, images, culture data (i.e., political boundaries, geographic places, land ownership; information regarding human constructed structures including roads, buildings, oil platforms and the like and/or environmental features) and fault data.

These data types are, in general, from a variety of sources and as a result are stored in different formats and have different data structures but as a rule they can be stored on common storage media such as a disc drive or array of drives. The stored data may be local to the rest of the system, or may be remotely accessible through a LAN, WAN, or via the Internet or other network, for example.

Modeling modules 104, which are configured to model physical, geophysical and/or geological properties of the geological region based on the data, accept a portion or all of the data as an input, and process it to produce models that provide the user with some insight as to the nature of the geological region. The modeling modules may include, for example, lithographic modeling, seismic modeling, map data management, geological history modeling, and hydrocarbon migration modeling. As will be appreciated, there are a variety of modeling techniques that can be used, and the specific modeling functionalities can be selected in accordance with appropriate design considerations.

An interface module 106 is operable by a user to input parameters and to select relevant portions of the input data for use by the modeling modules. For example, the interface may include a graphical user interface. For example, it may include functionality allowing a user to select areas where a fault line appears to exist. Likewise, the user may assign particular lithological labels to portions of the data in accordance with his expert interpretation of, for example, well log data. In an embodiment, a functionality for horizon picking within a 3-d visualization may be included.

The interface module 106 may also include functionality for controlling data management. As an example, the interface module may include functionality for combining types of data, for selecting types or sources of data to be displayed, or for modifying visualizations of data.

A central data management module 108 interacts with the modeling modules 104 and the interface module 106. As changes to parameters or information relating to expert interpretation of the data are made by the user, those changes are propagated to the other modeling modules via the data management module. Returning to the fault line example, when a fault line is added to a visualization or modified using the interface module 106, that information is passed to the central data management module 108. The central data management module 108 then passes the fault locations to the various modeling modules 104, which incorporate the fault information into their modules. Thus, as the modeling modules receive the new information, the data are re-processed in accordance with the changed data or parameters. In an embodiment, such changes are reprocessed in real time.

Continuing with the fault example, fault information may be passed to a module that models hydrocarbon migration. The fault would be incorporated into the model and could be treated as a trap or a conduit for hydrocarbon migration, altering the model's expected location of hydrocarbon reservoirs. If the models are configured to process the new data in two dimensions, then the modeling calculations may be processed relatively faster than if three dimensional calculations are required.

A number of display modules or viewers 110, which may themselves either incorporate or be incorporated by portions of the interface module, allow for various data views. In this regard, the modeling modules 104 pass information regarding modeled properties of the region to a display module that renders graphical displays based thereon. As a memory management solution, the central data management module may be programmed to push data to the viewer modules for display and then to ensure that calculations necessary to produce the image data that is being displayed are removed from active memory.

Figure 2A:
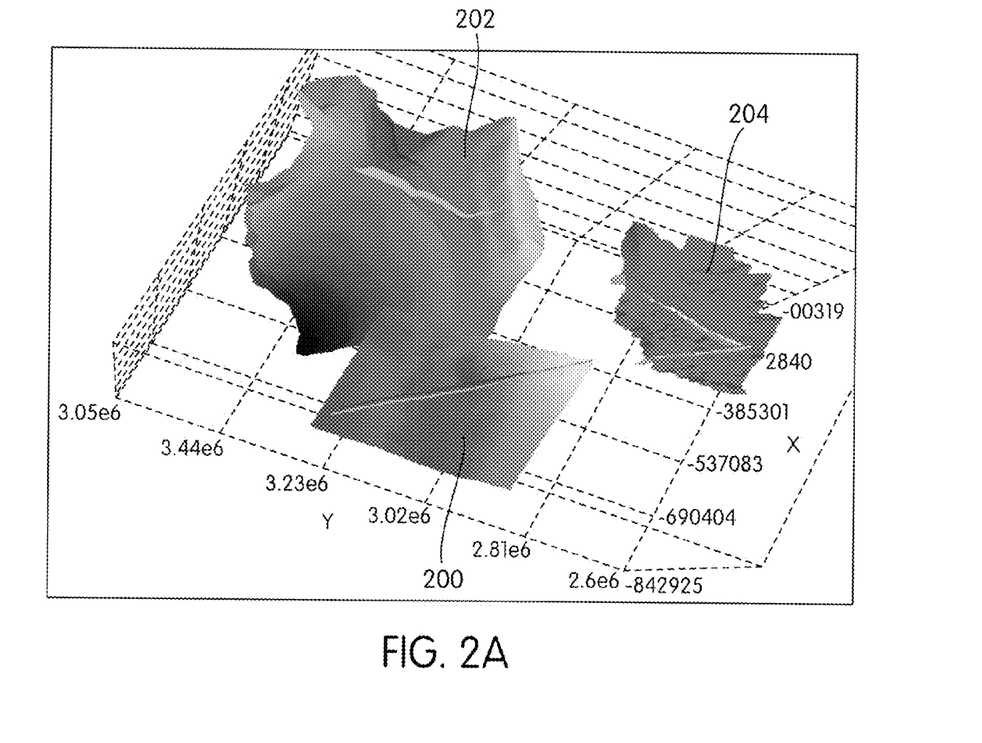
FIG. 2A-2E are illustrations of an embodiment of integrated visualization functionality.
Figure 2B:
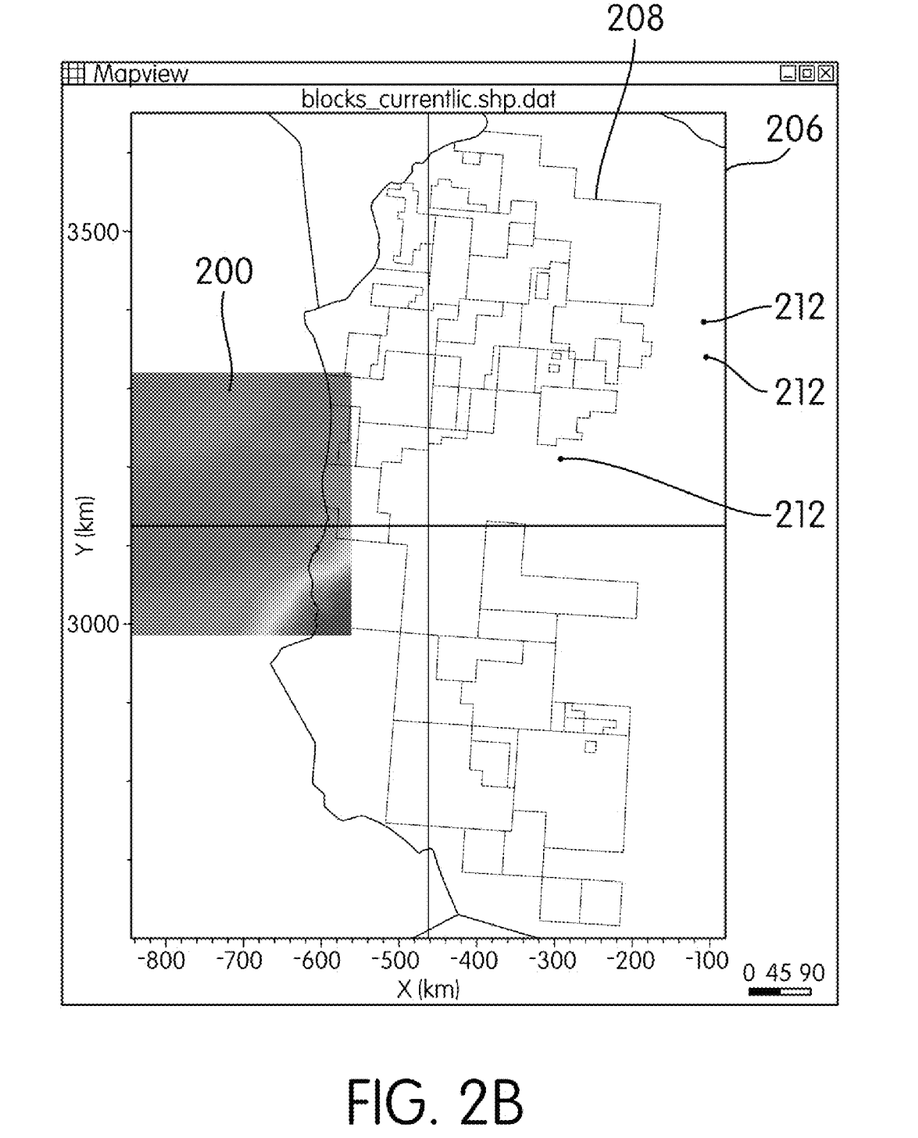

FIG. 2A shows three dimensional basin modeling data 200, 202, 204, which may represent, for example, basin models from three different sources. Another view module may render an overhead, or map, view. As illustrated in FIG. 2B, a map 206 of a reservoir area 208 may include an overlay of block boundaries 208, indications of where wells have been drilled 212, onto which basin modeling data 200 has been copied.

Figure 2C:
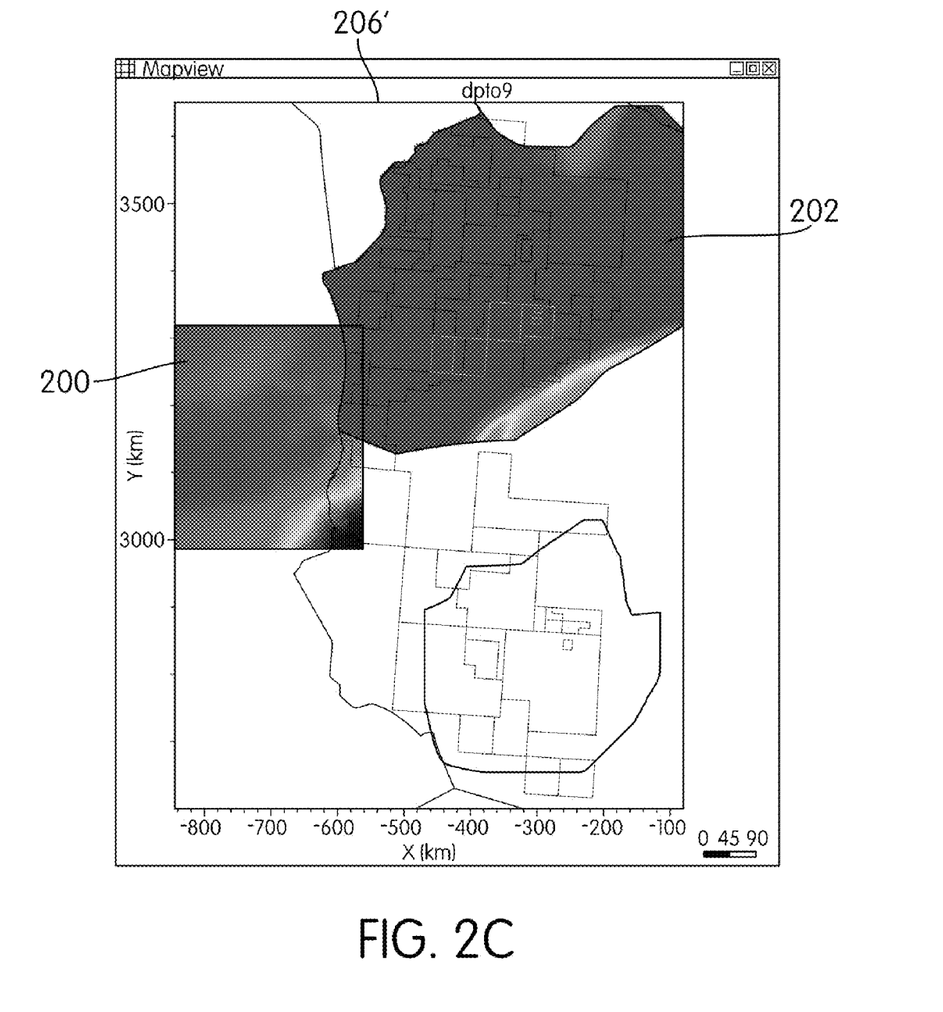
Figure 2D:
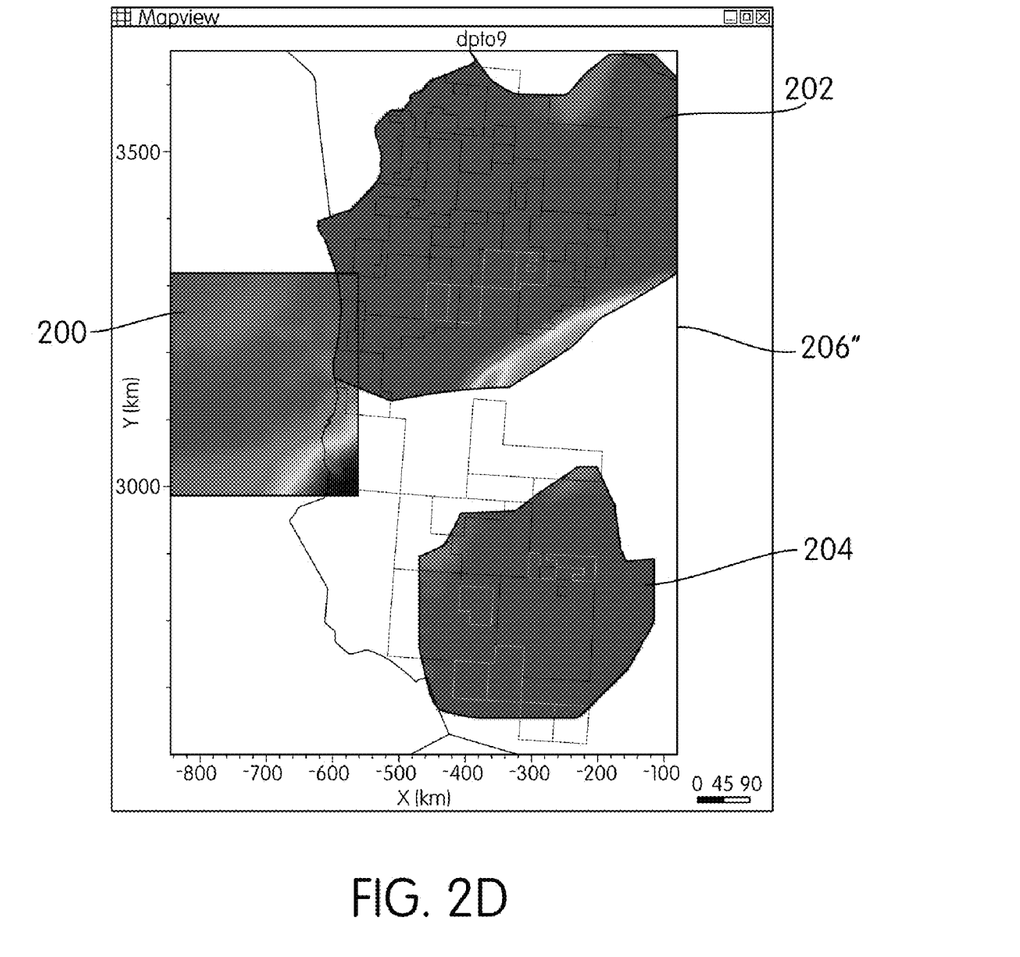

In this embodiment, the system includes a facility for selecting areas of interest via an interface module 106, and pasting from one view to another, such that the basin model information may be pasted into the map 206' within a selected area. In FIG. 2C, the second region 202 has been pasted, while in 2D, the third region 204 is pasted onto map 206". In this manner, the information represented in FIG. 2A is superimposed on the map view of FIG. 2B-D, allowing an analyst to view several types of information concurrently and to integrate the information in conducting analysis of the basin.

Figure 2E:
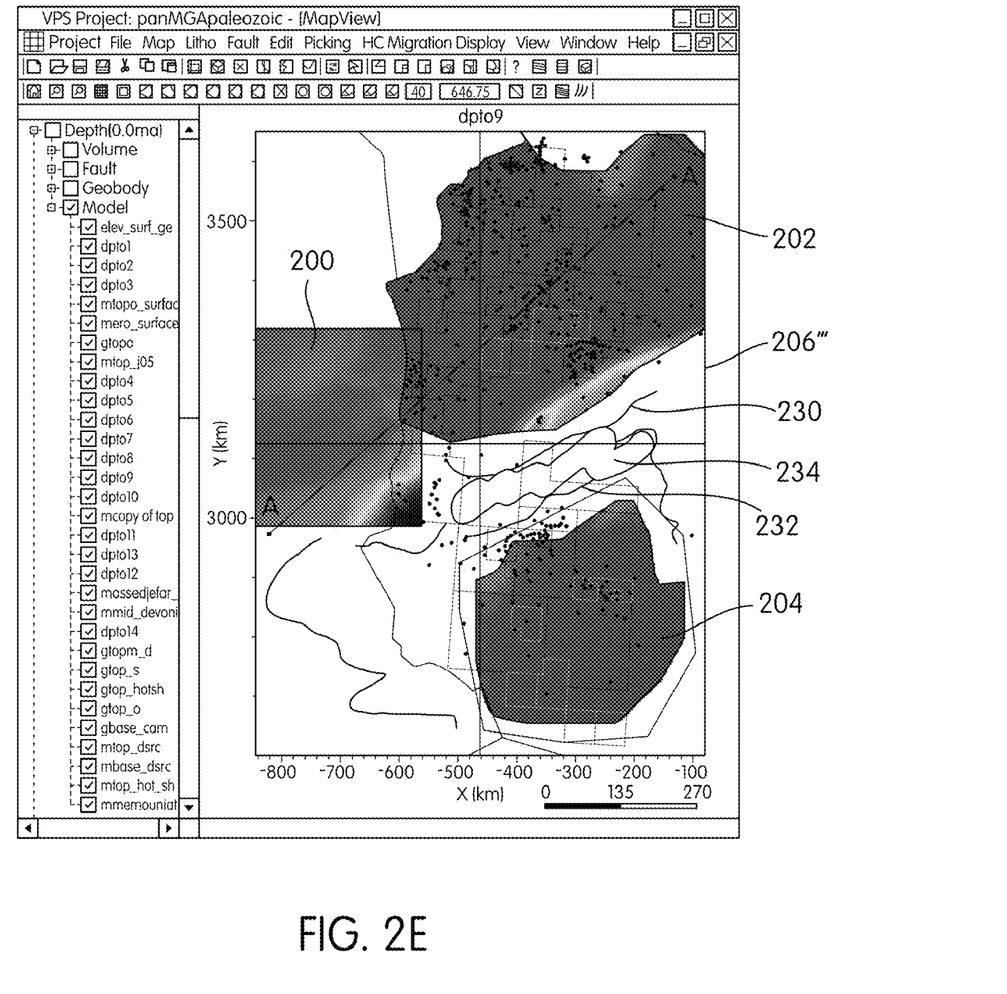

The interface module may also include functionality for allowing map editing, painting, polygon fill or the like. An example of such an edited map is shown in FIG. 2E, where the map 206''' is shown as including information from all three regions 200, 202, 204. As may be seen, the user has indicated, via lines 230 and 232, and via the widely painted region 234, basin topographic information. The input basin topographic information can be derived from other data sources, or may be, for example, based on expert interpretation of the adjacent regions. Additionally a cross section A-A of interest has been designated. In an embodiment, the designated cross section may be selected for display in a display module.

In an embodiment, the display module renders the reprocessed properties in real time, allowing a user to see the effect of changes in the parameters as those changes are input into the system.

One method of accelerating this real-time reprocessing is, as briefly described above, conducting all, or most, modeling in two dimensions. The two dimensional models can then be used to create two dimensional images. By displaying the two dimensional images in a pseudo three dimensional space, the appearance of three dimensional information can be conveyed.

Furthermore, even three dimensional information may be included and displayed in relation to the two dimensional information. In this regard, display and modeling can be accelerated by restricting three dimensional information to two dimensional representations.

Figure 3:
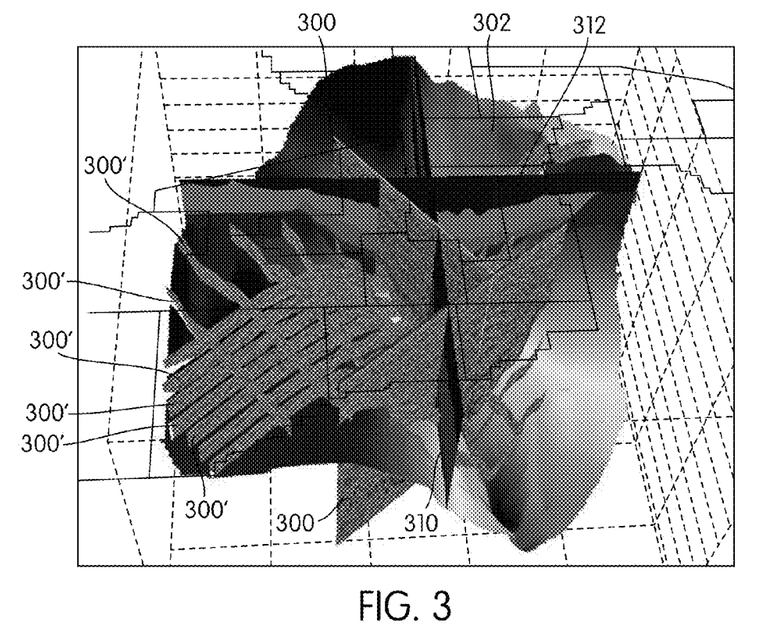
FIG. 3 is an illustration of a pseudo-3D visualization in accordance with an embodiment of the present invention.

As illustrated in FIG. 3, a number of two dimensional seismic lines 300 are arranged in accordance with their three dimensional relative orientations and positions. Furthermore, this display includes some three dimensional information in the form of one horizon 302 of a three dimensional basin model. By restricting the three dimensional information to a relatively thin slice, it can be treated as two dimensional and can be evaluated and updated relatively rapidly.

In an embodiment, visibility of information of interest can be improved by providing a cutaway view. As seen in FIG. 3, a number of the seismic lines 300' are shown with a reduced height as thin stripes. If every seismic line were to be shown in full height, the ones in the foreground would block a view of the ones in the background. Alternately, the interface may allow for a user to rotate the visual display in order to reveal previously obscured portions of the display.

Also shown in FIG. 3 are two crossing two dimensional images 310, 312. These two images represent geological information that may be, for example, determined by combining information from the seismic imaging with lithological and geological information from other modeling modules. As will be appreciated, portions of this information may be derived from expert interpretation and the results of that interpretation may be input using the interface module 106.

Figure 4:
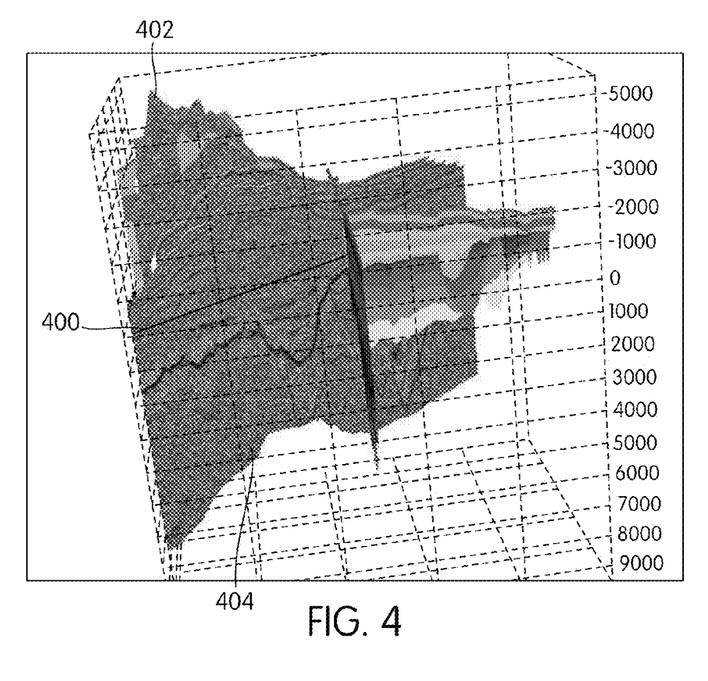
FIG. 4 is an illustration of a pseudo-3D visualization in accordance with an embodiment of the present invention.

The interface module may further include functionality for selecting a horizon of interest within the displayed data. Once selected, various operations are possible, including for example flattening the selected horizon. As illustrated in FIG. 4, the horizon 400 has been flattened, with the effect of changing the vertical positions of other horizons, resulting in the raised portion 402 and the corresponding lifting of the bottom horizons at 404. Other displayed objects (such as seismic 2D lines) can likewise be correspondingly adjusted relative to the reference surface or the flattened horizon. As will be appreciated, such selective flattening can be used for a number of purposes, including, for example, inspection for the existence of crossover between stratigraphic units. Where such a crossover is noted, a user may enter a correction using the interface module and the correction will be propagated via the central data management module back to each of the modeling modules In an embodiment, salt history modeling may be included as one of the modeling modules 104. In this embodiment, a region containing a salt formation that overlies a sediment region is modeled by defining an initial geometry of a salt volume and sediment volume in three dimensions. Time-wise steps are taken, and at each step, a geometry of the salt top is changed while the sediment top and the salt volume are maintained as constants. Changes to the salt top geometry may be made, for example, in accordance with apparent historical changes in overlying sedimentary layers.

During the modeling, other models' results are included as inputs to the salt volume modeling. For example, as other models indicate faulting or other geological activity such as folding or deformation, those changes are incorporated into the salt model. As will be appreciated, where those activities impact the shape of the salt base, the initial assumption that the salt base has a constant geometry is incorrect. As a result, salt base geometry is updated in accordance with the changes to the adjoining formations.

Additionally, functionality may be included for modeling dissolved salt (i.e., removed salt) and deposited salt, depending on the exposure of the salt volume to an environment where dissolution can take place.

In an iterative process, a user may control the salt history progression. In particular, the user may guide the aforementioned integration of data from fault and other models. Likewise, a user may provide guidance for modeling of complex sub-salt structures and salt reentry issues.

As an output, a series of three dimensional images can be generated that each represent one of the time-wise steps. Furthermore, the time-wise steps may be used as time varying inputs to other models that include time components. For example, where a hydrocarbon migration model is included, flow parameters can be adjusted through time as the salt model changes.

Figure 5A:
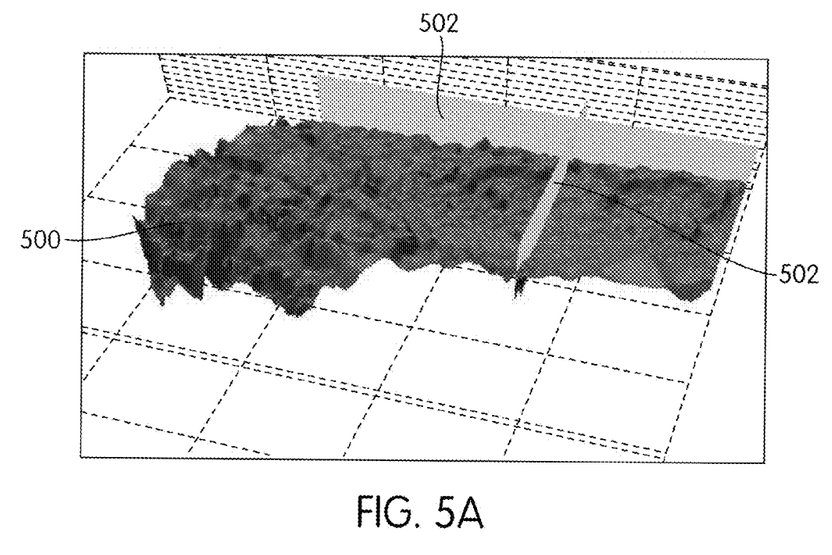
FIG. 5A-C are illustrations of an embodiment of salt restoration functionality.
Figure 5B:
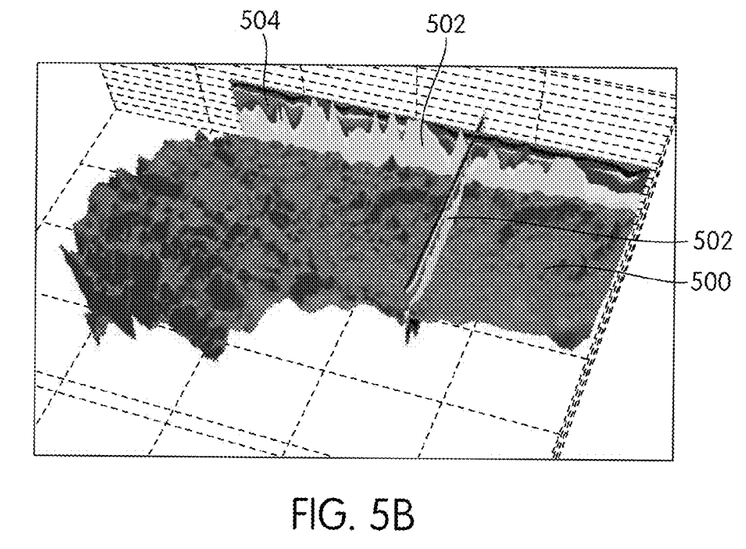
Figure 5C:
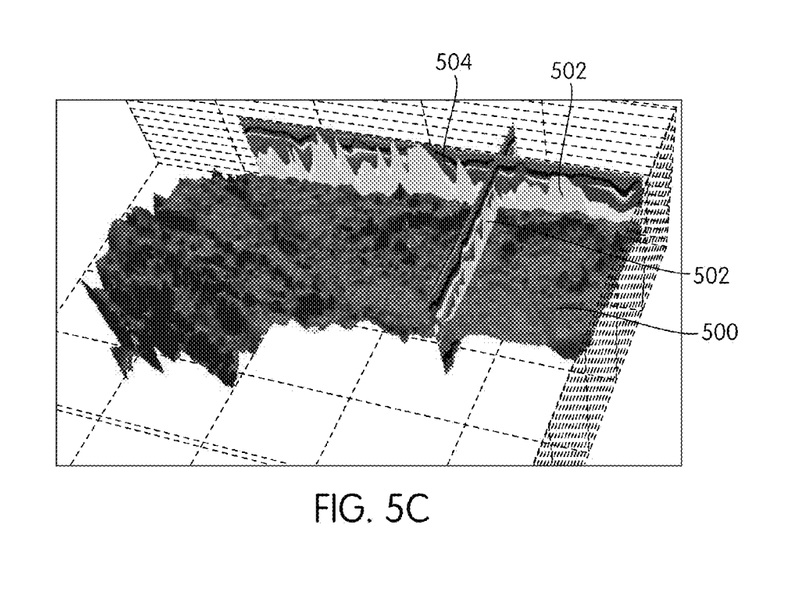

As illustrated in FIGS. 5A-C, a salt bottom 500 forms a bottom layer of the salt formation 502 shown in the form of two cross-sectional areas. FIG. 5B represents a time step from the initial formation as shown in FIG. 5A. Additional sediment layers 504 overlie the salt formation 502 while the base 500 has remained substantially constant. The salt top is significantly changed, however a total volume of salt is maintained. FIG. 5C represents a last time interval in the progression and would in practice represent the present-day state of the salt basin as measured, for example, by seismic imaging.

In an embodiment, functionality may be included for interpolation of lithographic fades by a probabilistic approach. In this approach, a particular interval is selected for interpolation and a top and bottom facies are defined for the interval. The source may be, for example, a seismic cross section or other seismic data including seismic images, seismic maps, seismic stratal slices or the like.

A user selects a lithological interpretation for the top and bottom facies, for example by brush drawing, polygon filling or other typical conversion methods, such as correlation between lithologic facies vs. seismic attributes, sediment thickness, paleo-bathymetry and the like. Then, the interval is divided into a number of thin layers for interpolation by a stochastic method.

In the stochastic interpolation approach, the thin layers are each assigned a lithology group based on the top and bottom layers, with a random variation introduced. A gradient between the composition of the top layer and that of the bottom layer may be applied so that as the layers get closer to one or the other, they likewise become closer in composition. As an example, the distance of a given layer can be used to generate weightings for the composition of that layer relative to the top and bottom layers. Then, a random component is applied and constrained, for example, by a normal distribution.

For each layer, the sum of the components is determined by the top and base litho-facies, but the lateral distribution of the components along any given portion of the layer is rearranged by applying a normal distribution function to them. Optionally, a number of iterations of applying the normal distribution function may be performed. The number of iterations may be determined, for example, by checking the litho-facies against seismic attributes or well logs. If necessary, manual adjustments may be made. Likewise, shifts may be introduced, so that the interval more closely matches a realistic composition. Finally, information from other data sources, such as seismic lines that cross the same region, can be used to modify the interpolated results for portions of the layer that intersect such data.

Figure 6A:
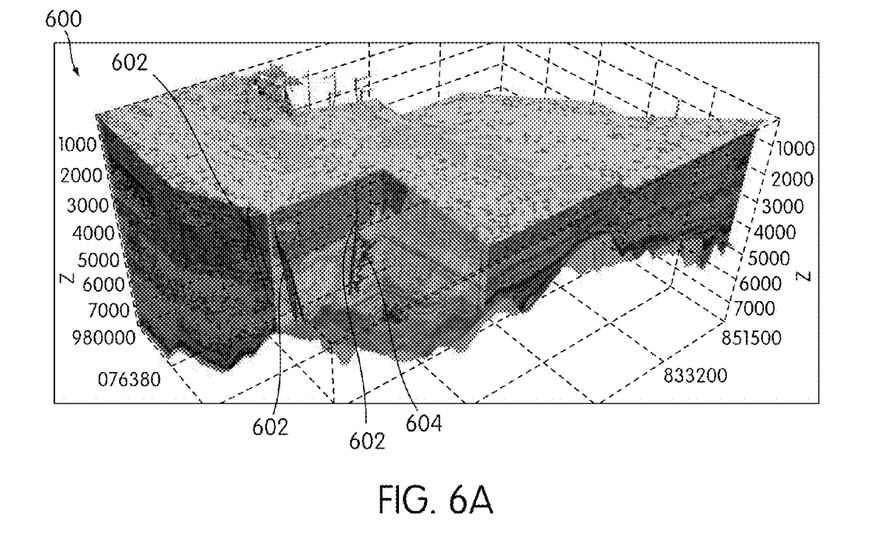
FIG. 6A-B are illustrations of an embodiment of lithofacies interpretation functionality.

FIG. 6A illustrates a three dimensional view of a lithographic model in accordance with the foregoing embodiment. As can be seen, in addition to the facies information, indicated generally at 600, this view may include integrated information from other sources. As illustrated, a number of wells 602 and their respective well logs 604 can be overlaid on the litho facies information. The random variation due to the stochastic process can be seen as the varying shaded rectangular areas best visible in the top layer.

Figure 6B:
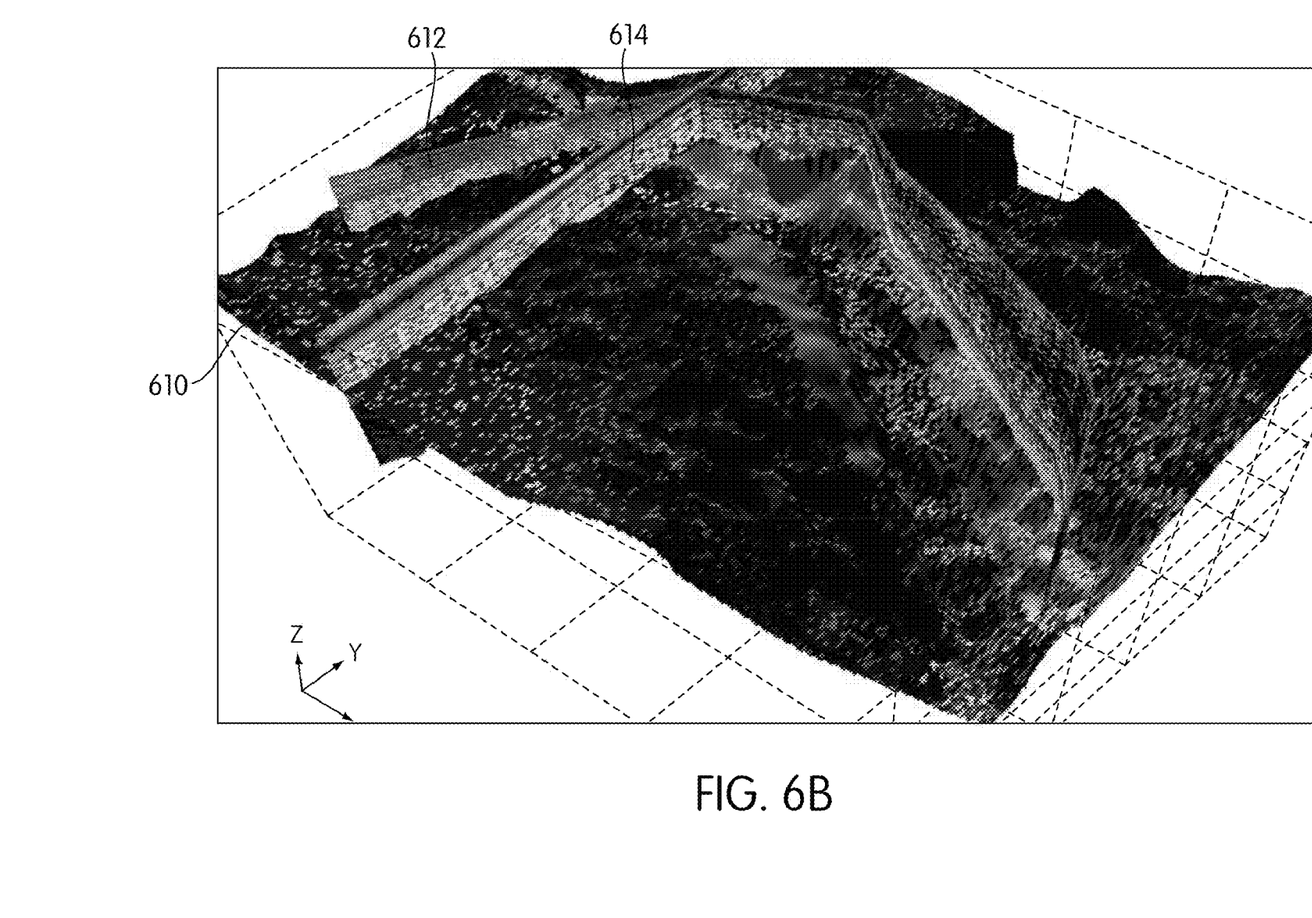

FIG. 6B illustrates a single horizon 610 instead of the three dimensional view of FIG. 6A. The horizon is crossed by two cross-sections 612, 614 in which randomly varying layers are visible.

In an embodiment, one of the modeling modules may be directed to hydrocarbon migration modeling. As will be appreciated, a migration module may use as input information from any of the other data sources that relates to hydrocarbon migration. As examples, information regarding permeability (such as may be derived from well logging, lithology, and the like), faults, which may act as pathways or seals, salt formation and history, and deposition history may all form inputs to the migration model.

In particular, the model may take as an input a high-resolution model such as a permeability and saturation based flow model. The model may include both oil and gas migration and entrapment.

In the embodiment, rather than a step-wise movement through time for the entire basin, each source point is treated independently. For a random source point, the migration progresses through time along a path that seeks to maximize the reduction of potential, i.e., a minimum energy path, wherein resistance to flow is opposed by buoyancy. Where a time varying geology is known (or modeled), for example where a salt history or depositional history is known, the time variation is included in the flow model under which the reduction of potential is evaluated.

Because all sources are evaluated independently, they are considered as having no interaction with other sources until they reach a trap. For each source, calculation is stopped upon arrival at a trap. Because a trap may have a maximum fill volume, the independent treatment must be suspended at traps where evaluation for spill is performed. If a total volume of hydrocarbon arriving at a particular trap exceeds the volume capacity, then the extraneous portion can be further migrated using the model.

Figure 7:
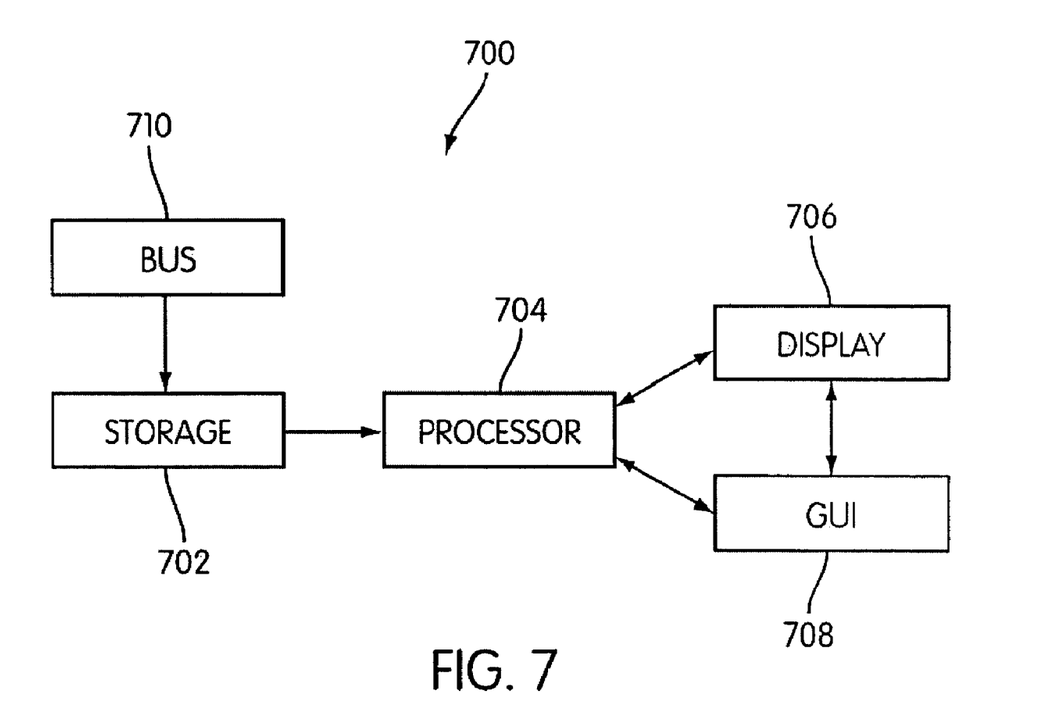
FIG. 7 is a schematic illustration of an embodiment of a system for performing methods in accordance with embodiments of the present invention.

A system 700 for performing the method is schematically illustrated in FIG. 7. A system includes a data storage device or memory 702. The stored data may be made available to a processor 704, such as a programmable general purpose computer. The processor 704 may include interface components such as a display 706 and a graphical user interface 708. The graphical user interface may be used both to display data and processed data products and to allow the user to select among options for implementing aspects of the method. Data may be transferred to the system 700 via a bus 710 either directly from a data acquisition device, or from an intermediate storage or processing facility (not shown).

As will be appreciated, the individual data sources, modeling modules and view modules may be typical software programs in accordance with usual practice. The central data management module is designed in accordance with the input and output requirements of these modules. In an embodiment, the various modules are implemented in an object oriented programming language in which properties are defined in accordance with specified classes. When one of the modules initiates a change to a particular item of data, either in response to a user input or as a result of a modeling calculation, the change is returned to the central data management module which then propagates the change to the data in the same class as the changed data, thereby ensuring that all modules are synchronized.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC programmed to execute the methods, a computer array or network, or other appropriate computing device. As a further example, it is to be understood that the present invention contemplates that, to the extent possible, one or more features of any embodiment can be combined with one or more features of any other embodiment.

What is claimed is:

1. A method of modeling a salt history for a geologic region containing a salt formation comprising:
    defining initial geometry of salt volume and sediment volume in three dimensions;
    changing geometry of a top of the salt in accordance with changes in overlying sedimentary layers and maintaining the geometries of a top of the sediment and a base of the salt formation for a plurality of time steps;
    for each change of geometry, conserving a volume of salt and a volume of sediment;
    initially constraining a geometry of the base of the salt during the changing geometry of the salt and sediment volumes;
    modeling separately geological activity in the geologic region and modifying separately the base of the salt formation during a time of the time steps based on the separately modeled geological activity; and
    modifying the volumes in accordance with the separately modeled geological activity.

2. A method as in claim 1, further comprising, restoring a dissolved salt volume in response to a user input.

3. A method as in claim 1, wherein the modeled geological activity includes faulting and formation deformation.

4. A method as in claim 1, further comprising:
    displaying a three dimensional image of the salt formation and the sediment volume corresponding to each time step.

5. A method as in claim 4, wherein, in response to an input, a particular image corresponding to a particular time step is displayed.

6. A method as in claim 4, wherein, in response to an input, a particular sequence of images corresponding to particular respective time steps are displayed.

7. A method as in claim 1, wherein information relating to the modeled changes in geometry are further provided to a hydrocarbon migration model and are used therein to constrain modeled migration of hydrocarbons.

8. A system for modeling a salt history for a geologic region containing a salt formation comprising:
    a data storage system, comprising a physical storage medium configured and arranged to store data representing initial geometry of salt volume and sediment volume in three dimensions;
    a processor configured to receive the stored data and to execute a modeling module, wherein the modeling module is configured and arranged
    to model changing geometry of a top of the salt in accordance with changes in overlying sedimentary layers while maintaining the geometries of a top of the sediment and a base of the salt formation for a plurality of time steps;
    to conserve a volume of salt and a volume of sediment for each change of geometry;
    to initially constrain a geometry of the base of the salt during the changing geometry of the salt and sediment volumes;
    to model separately, geological activity in the geologic region and modifying separately the base of the salt formation during a time of the time steps based on the separately modeled geological activity; and
    to modify the volumes in accordance with the separately modeled geological activity.

9. A system as in claim 8, further comprising, an input module, configured and arranged to accept a user input wherein the modeling module restores a dissolved salt volume in response to the user input.

10. A system as in claim 8, wherein the modeled geological activity includes faulting and formation deformation.

11. A system as in claim 8, further comprising:
    a display module, configured and arranged to display a three dimensional image of the salt formation and the sediment volume corresponding to each time step.

12. A system as in claim 8, further comprising:
    a display module, configured and arranged to display, in response to an input, a particular image corresponding to a particular time step.

13. A system as in claim 8, further comprising:
    a hydrocarbon migration modeling module, wherein information relating to the modeled changes in geometry are further provided to a hydrocarbon migration model and are used therein to constrain modeled migration of hydrocarbons.

14. A non-transitory machine-readable medium encoded with machine-executable instructions which, when executed perform a method of modeling a salt history for a geologic region containing a salt formation comprising:

defining initial geometry of salt volume and sediment volume in three dimensions;

changing geometry of a top of the salt in accordance with changes in overlying sedimentary layers and maintaining the geometries of a top of the sediment and a base of the salt formation for a plurality of time steps;

for each change of geometry, conserving a volume of salt and a volume of sediment;

initially constraining a geometry of the base of the salt during the changing geometry of the salt and sediment volumes;

modeling separately geological activity in the geologic region and modifying separately the base of the salt formation during a time of the time steps based on the separately modeled geological activity; and modifying the volumes in accordance with the separately modeled geological activity.

* * * * *